(12) United States Patent
Brandley et al.

(10) Patent No.: US 10,869,457 B1
(45) Date of Patent: Dec. 22, 2020

(54) RATCHETED PIPE AND STRAP OPERATING DRIVE SYSTEM FOR DOOR MECHANISMS

(71) Applicants: Ari M. Brandley, Newnan, GA (US); J. Theodore Brandley, Newnan, GA (US)

(72) Inventors: Ari M. Brandley, Newnan, GA (US); J. Theodore Brandley, Newnan, GA (US)

( * ) Notice: Subject to any disclaimer, the term of this patent is extended or adjusted under 35 U.S.C. 154(b) by 0 days.

(21) Appl. No.: 16/687,188

(22) Filed: Nov. 18, 2019

(51) Int. Cl.
A01K 1/00 (2006.01)
A01K 31/02 (2006.01)
E05F 15/627 (2015.01)

(52) U.S. Cl.
CPC ............ *A01K 1/0064* (2013.01); *A01K 31/02* (2013.01); *E05F 15/627* (2015.01); *E05Y 2201/706* (2013.01); *E05Y 2600/626* (2013.01); *E05Y 2900/11* (2013.01)

(58) Field of Classification Search
CPC ..... A01K 1/0064; A01K 31/02; E05F 15/627; E05Y 2201/706; E05Y 2600/626; E05Y 2900/11
See application file for complete search history.

(56) References Cited

U.S. PATENT DOCUMENTS

| | | | | | |
|---|---|---|---|---|---|
| 315,250 | A | * | 4/1885 | Cook | E04F 10/10 160/132 |
| 563,218 | A | * | 6/1896 | Buchanan | B62D 33/0273 296/58 |
| 1,899,943 | A | * | 3/1933 | Burleigh | E06B 7/06 454/225 |
| 2,129,221 | A | * | 9/1938 | Lewis | E05D 15/403 49/205 |
| 2,392,678 | A | * | 1/1946 | Loetscher | E06B 3/38 49/71 |
| 6,481,156 | B1 | * | 11/2002 | Richmond | A01K 1/0017 49/24 |
| 6,871,842 | B2 | * | 3/2005 | Sutton | B66D 1/06 119/493 |
| 7,441,732 | B2 | * | 10/2008 | Ferragut | H02G 3/30 248/74.1 |

(Continued)

*Primary Examiner* — Monica L Barlow
*Assistant Examiner* — Aaron M Rodziwicz
(74) *Attorney, Agent, or Firm* — J.T. Hollin, Jr., Attorney at Law, P.C.

(57) ABSTRACT

A ratcheted "Pipe and Strap Operating Drive System" (PSODS) is disclosed which efficiently and accurately positions a blocker, or door mechanism, over an opening which is of similar profile and dimensions as the door mechanism. In the preferred embodiment, PSODS is used to vary the position of a poultry house ventilation blocker or door mechanism from a tightly-closed position against the opening, or when required, within a certain range of door mechanism open positions, as dictated by weather conditions or internal air quality. At least two ratcheted reels are co-axially connected to the exterior of a tubular "pipe drive." Each reel is connected, at its core, to the first end of a strap, with the second end of the strap being connected to the door mechanism. Upon axial rotation of the pipe drive in either direction, the reels simultaneously rotate, straps move correspondingly so as to position the entire door mechanism within a desired range relative to the opening.

4 Claims, 5 Drawing Sheets

(56) References Cited

U.S. PATENT DOCUMENTS

| | | | | |
|---|---|---|---|---|
| 8,327,805 B2* | 12/2012 | Rogge | ............... | A01K 1/0064 |
| | | | | 119/437 |
| 8,549,711 B2* | 10/2013 | Apostoloff | ............ | E05D 11/06 |
| | | | | 16/319 |
| 9,302,606 B2* | 4/2016 | Danze | ................ | B60P 7/0823 |

* cited by examiner

RATCHETED PIPE AND STRAP OPERATING DRIVE SYSTEM FOR DOOR MECHANISMS

CROSS-REFERENCES TO RELATED APPLICATIONS

Not applicable.

STATEMENT REGARDING FEDERALLY SPONSORED RESEARCH OR DEVELOPMENT

Not applicable.

NAMES OF THE PARTIES TO A JOINT RESEARCH AGREEMENT

Not applicable.

BACKGROUND OF THE INVENTION

(1) Field of the Invention

The disclosures herein are primarily concerned with proper ventilation in large-scale poultry houses. Poultry and livestock houses supply fresh air to the interior of building in order to sustain healthful life of the animals confined within. Proper ventilation systems also help reduce the extremes of temperature, humidity and air contamination caused by chemical compounds, especially resulting from, for instance, large numbers of confined chickens.

Over the last thirty years poultry ventilation systems have improved considerably, thus making possible the high density populations of livestock and poultry in which are often confined in commercial facilities. This is economically important since it reduces production and labor costs.

In a considerable number of poultry raising houses, the ventilated air is controlled by ventilation doors, which either close the normal ventilation opening in substantially cold weather, or allow the doors to move to a partly open position, allowing ventilation fans to more efficiently circulate air. The ventilated air removes excess heat, moisture, dust, and odors from the building. The circulated air also dilutes airborne disease organisms. If the air is not continuously ventilated in an enclosed poultry house the components of the air changes. The concentration of carbon dioxide, ammonia and other harmful gases may then increase to unacceptable levels.

(2) Description of the Related Art, Including Information Disclosed Under 37 CFR 1.97 and 1.98

U.S. Pat. No. 9,302,606 5 Apr. 2016: Improvements in a self-tightening holding strap that grips onto a tube. The strap uses an elastomeric cushion with hook and loop fasteners to hold the strap onto a tubular pipe. The hook and loop fasteners allows the self-tightening holding strap to be easily installed, removed and repositioned where desired. The elastomeric cushion conforms around a textured or powder coated surface to increase the gripping forces. The elastomeric cushion can expand slightly as forces increase but retain the high grip. A tightening clasp allows an installer to pull from only one side of the self-tightening holding strap with one or both hands and using the elastomeric cushion to prevent the self-tightening holding strap from sliding on the pole. The self-tightening holding strap is to be sewn onto a cover, canopy or strap.

U.S. Pat. No. 7,441,732; 28 Oct. 2008: Improvements in a self-tightening holding strap that grips onto a tube. The strap uses an elastomeric cushion with hook and loop fasteners to hold the strap onto a tubular pipe. The hook and loop fasteners allows the self-tightening holding strap to be easily installed, removed and repositioned where desired. The elastomeric cushion conforms around a textured or powder coated surface to increase the gripping forces. The elastomeric cushion can expand slightly as forces increase but retain the high grip. A tightening clasp allows an installer to pull from only one side of the self-tightening holding strap with one or both hands and using the elastomeric cushion to prevent the self-tightening holding strap from sliding on the pole. The self-tightening holding strap is to be sewn onto a cover, canopy or strap.

U.S. Pat. No. 8,549,711; 8 Oct. 2013: A hinge assembly for a door assembly includes a hinge having a first plate attached to a door and a second plate attached to a doorjamb and pivotally connected to the first plate. The hinge assembly further includes a check strap having a first end portion configured to be attached to the first plate, a second end portion configured to be attached to the second plate, and a strip secured to the first end portion and to the second end portion. The strip has a length that is selected to limit opening movement of the door to a predetermined angle of opening. The hinge assembly further includes fasteners to secure the first end portion of the check strap and the first plate to the door and the second end portion of the check strap and the second plate to the doorjamb.

U.S. Pat. No. 10,240,381; 26 Mar. 2019; Brandley et. al. A "Pipe and Strap Operating Drive System" (PSODS) is disclosed which efficiently and accurately positions a door mechanism, over an opening that is of exact or similar profile and dimensions as the door mechanism. In the preferred embodiment, PSODS is used to vary the position of a poultry house ventilation blocker or door mechanism from a tightly-closed position against the opening, or when required, within a certain range of door mechanism open positions, as dictated by weather conditions or internal air quality. The preferred embodiment utilizes two straps, wherein a first end of each strap is wound about a length of pipe, termed a "pipe drive." The second end of the strap is attached proximate an upper edge of the door mechanism. As the pipe drive is rotated, the attached strap(s) regulate movement of the door mechanism between a closed and open position.

BRIEF SUMMARY OF THE INVENTION

The current inventive concept is related to ventilation door systems commonly used in poultry and livestock houses. The vast majority of ventilation doors are operated by cable systems that need constant adjustments due to the stretching of the cables over time. If the ventilation doors are not tightly closed during adverse winter conditions, they will leak and cause cold air to enter the buildings, which increases heating expenses and exposes the poultry to drafts.

Cables also become brittle over time and can break, causing damage to doors and other equipment within the houses. For exemplary and illustrative purposes and not by reason of confinement to a particular industry application, the disclosed inventive concept, a "Pipe and Strap Operating Drive System" (referred to by the acronym, "PSODS" 1) will be demonstrated by its use in a poultry house.

The object of the PSODS 1 is to efficiently and accurately position a blocker, or door mechanism 20, over an opening 24 that is of exact or similar profile as the door mechanism 20. The opening 24 is generally defined by a corresponding perimeter 23. In the preferred embodiment, PSODS 1 is used to vary the position of a poultry house ventilation blocker or door mechanism 20 in a tightly closed position against an opening 24. When required, there is a certain range of door mechanism 20 open positions, as dictated by weather conditions or internal air quality.

Essentially, the inventive concept featuring PSODS 1 may operate with one strap driven by a single strap reel 44(a), (b). However, in the preferred embodiment, at least two strap reels 44 and corresponding straps 17, 18 (shown in FIG. 1) are utilized to provide a reliable and balanced range of motion for the door mechanism 20. Further, a plurality of door mechanisms 20 may be placed side-by-side to laterally cover a series of openings 24, the door mechanisms 20 being operated in unison, or individually, to provide the desired closure or opening of each door mechanism 20.

Figure 3:
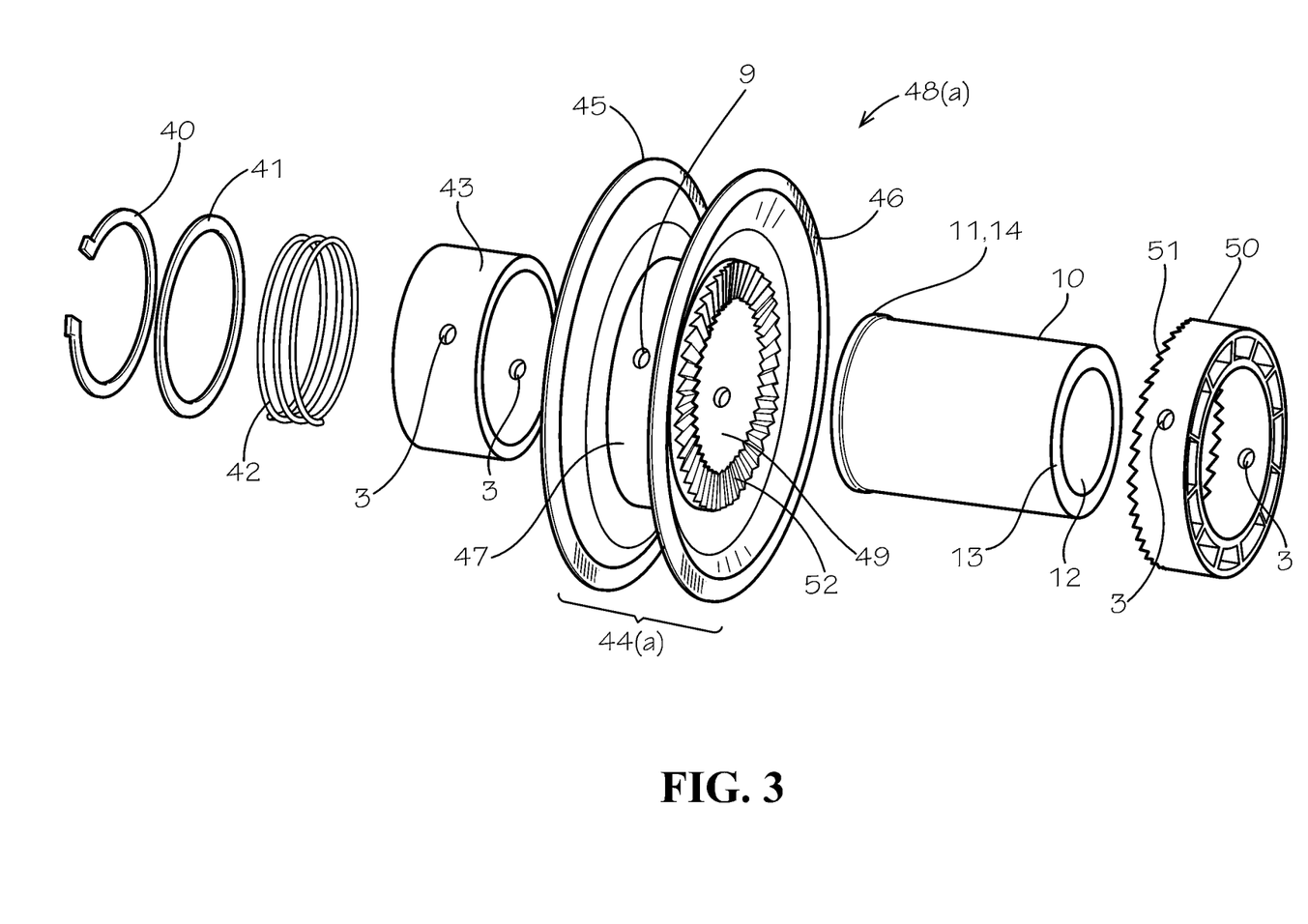
FIG. 3 illustrates an exploded view of the left reel assembly 48(a), showing the main components being the reel 44(a), pipe sleeve 10, plastic lock gear 50 and its driving gear teeth 51, pipe sleeve collar 43, and the collar spring 42.

A first end of each strap 17, 18, is connected to, and wound about the core 47 of each strap reel 44(a), (b) (the core 47 being visible in FIG. 3). Each of the individual strap reels 44(a), 44(b) forms the primary constituent of a "strap reel assembly" 48, as is shown in FIG. 3. Both strap reels 44(a), 44(b) are simultaneously rotated, via their connections to a tubular pipe, termed a "pipe drive shaft" 2. The second end of each strap 17, 18 is attached proximate a "traveling edge" 21 of the door mechanism 20.

The pipe drive shaft 2 may be rotated in one direction, about its longitudinal axis 8, to allow unwinding of the strap(s) 17, 18 so as to position the traveling edge 21 of the door mechanism 20 within a desired range of openness. Conversely, the pipe drive shaft 2 may be rotated in the opposite direction, causing a tight winding of the strap(s) 17, 18, to bring the door mechanism 20 into a firm door-closing position. The term "door mechanism 20 is utilized in this disclosure so as to encompass barriers, gates, hatches, eaves, trapdoors, flaps, and other similar mechanisms. Therefore, the term "door mechanism" 20 is not intended to be limited to presentations, descriptions, and illustrations of poultry house doors in this disclosure.

BRIEF DESCRIPTION OF THE VIEWS OF DRAWINGS AS EXEMPLARY EMBODIMENTS OF THE INVENTIVE CONCEPT

FIG. 4 primarily shows the first strap reel 44(a), the cylindrical lock gear 50, a segment of the left strap 47, the pipe drive 2, and further showing a separation between driving gear teeth 51 and driven gear teeth 52.

DETAILED DESCRIPTION OF THE INVENTION

The objects, features, and advantages of the inventive concept presented in this application are more readily understood when referring to the accompanying drawings. The drawings, totaling six figures, show the basic components and functions of embodiments and/or methods of use. In the several figures, like reference numbers are used in each figure to correspond to the same component as may be depicted in other figures.

Figure 1:
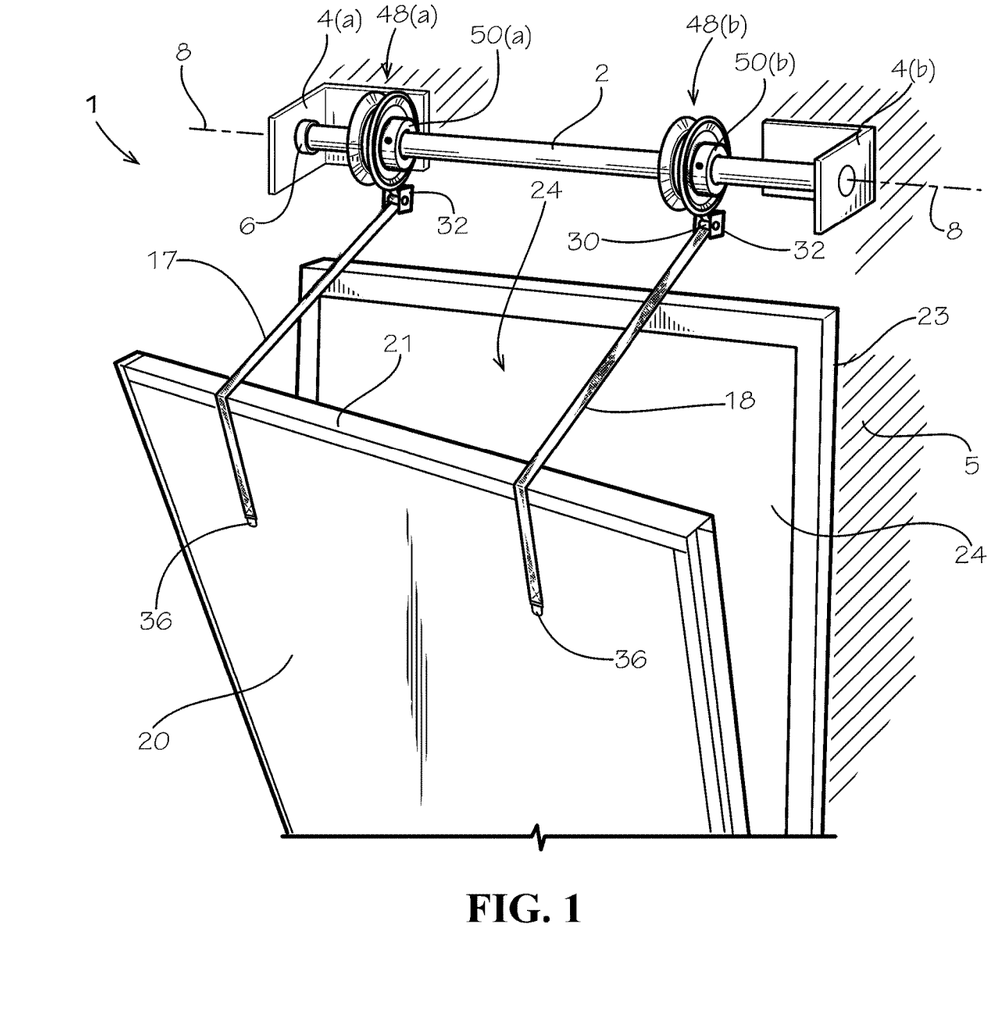
FIG. 1 depicts a door mechanism 20 partially open, with left and right straps 17, 18 extended from two strap assemblies 48(a), 48(b) and the associated reels, 44(a), 44(b), thus retaining the door mechanism 20 in the open position.

The discussion of the present inventive concept will be initiated with FIG. 1, which illustrates the essential functional concept of the "Pipe and Strap Operating Drive System" ("PSODS" 1). The operation of PSODS 1 in FIG. 1 depicts a door mechanism 20 in a partially open position, relative to a vertically-oriented cavity, or opening 24. The opening 24, for illustrative purposes, and not by way of limitation, is shown built into a vertically oriented surface of a depicted structure 5. A corresponding frame 23 further surrounds the perimeter of the cavity/opening 24. The perimetral frame 23 coincides with the outer profile of the door mechanism 20.

The door mechanism 20 further comprises an upper, "traveling" edge 21 and a bottom edge 22 (shown in FIG. 5) the bottom edge 22 being hingedly connected to the structure 5. By virtue of the operation of the PSODS 1, the traveling edge 21 moves in an arc pattern and when the door mechanism 20 is fully closed, the traveling edge 21 abuts the top portion of the perimetral frame 23, thereby sealing the opening 24.

As can be seen in FIG. 1, the door mechanism 20 is maintained in an open position by virtue of the weight of the door mechanism 20 pressed against a left strap 17 and a right strap 18. Each strap 17, 18 of the strap reels 44(a), 44(b) is symmetrically attached, at its first end, to the core 47 of the respective first strap reel 44(a) and the second strap reel 44(b), respectively. Each of the strap reels comprises a reel assembly more readily described by FIG. 2 and FIG. 3. The second end of each strap 17, 18 is connected to a bolt clip 36, which bolt clip 36 provides a means to fasten each strap 17, 18 to the door mechanism 20 by a wood or machine screw.

Figures 5, 6, 7:
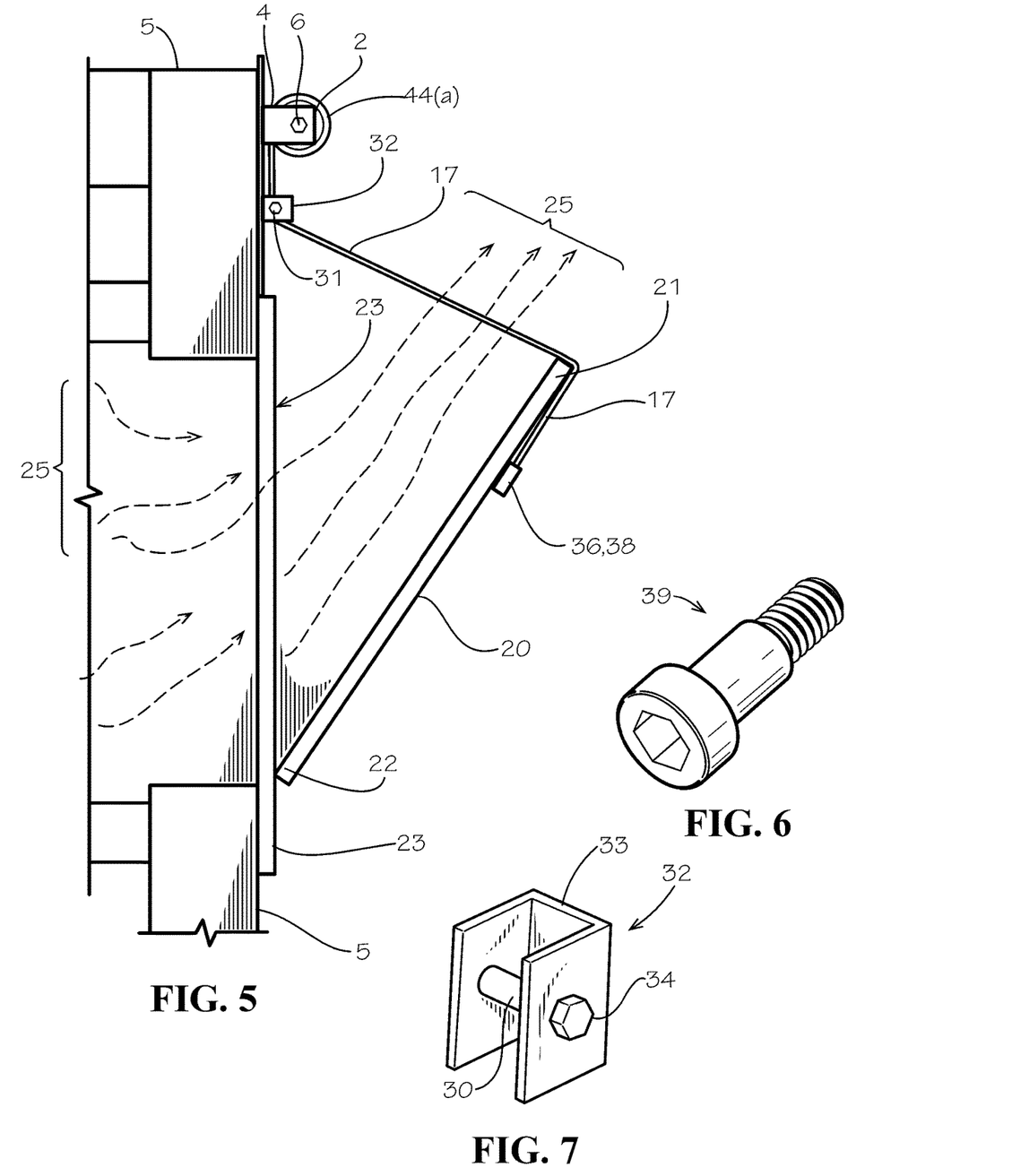
FIG. 5 presents a cutaway view of the arrangement of the PSODS 1 operating a door mechanism 20 attached to a vertically-oriented structure 5.
FIG. 6 is an enlarged view of a typical hexagonal head locking setscrew 39 used to connect various components of the PSODS 1.
FIG. 7 depicts a typical guide bracket 32, further showing a roller pin 30 used for guiding and restraining either strap 17, 18 during movement of the strap reels 44(a), (b) and door mechanism 20.

In FIG. 1 it is noted that two guide brackets 32 are affixed to the structure 5, each guide bracket 32 shown attached immediately below the respective placements of the first and second reel assemblies 48(a), 48(b). The left strap 17 has been routed through the interior of a first guide bracket 32, and likewise, the right strap 18 is also routed through the interior of a second guide bracket 32. A more detailed rendering of the guide brackets 32 is depicted in FIG. 2 and FIG. 7.

It is to be pointed out that the PSODS 1 concept is not restricted to operating in conjunction with vertically-oriented planar structures 5, but may also be utilized on surfaces of structures built at an angle to the vertical, or horizontal ceiling-type structures The door mechanism 20 may be either planar or manifest a curvilinear surface. The PSODS 1 is specifically designed and constructed to maintain a door mechanism 20 completely closed against the cavity, or opening 24, or allow the door opening mechanism 20 to be positioned with a range of settings or positions spaced apart from the opening 24. In the preferred embodiment, the PSODS 1 device serves to provide ventilation control of large-volume poultry houses.

A key component of the PSODS 1 is the horizontally-oriented pipe drive shaft 2, which, in the preferred embodiment, is a straight, pipe-like structure. In FIG. 1, the depicted pipe drive shaft 2 is shown supported on each end by an L-shaped brace 4(a)b, 4(b), one leg of each brace 4(a), 4(b) being securely attached to the surface of the structure 5. A circular shaft collar 6 is shown as forming an integral part of the outwardly protruding leg of the left brace 4(a). The circular drive shaft collar 6, on both left and right braces 4, serves to form a housing within which each respective end of the pipe drive 2 may spin when the pipe drive 2 is rotated about its longitudinal axis 8. Each draft shaft collar 6 may also provide access for the insertion of a manual or powered means of turning the pipe drive shaft 2 about its longitudinal axis 8.

Figure 2:
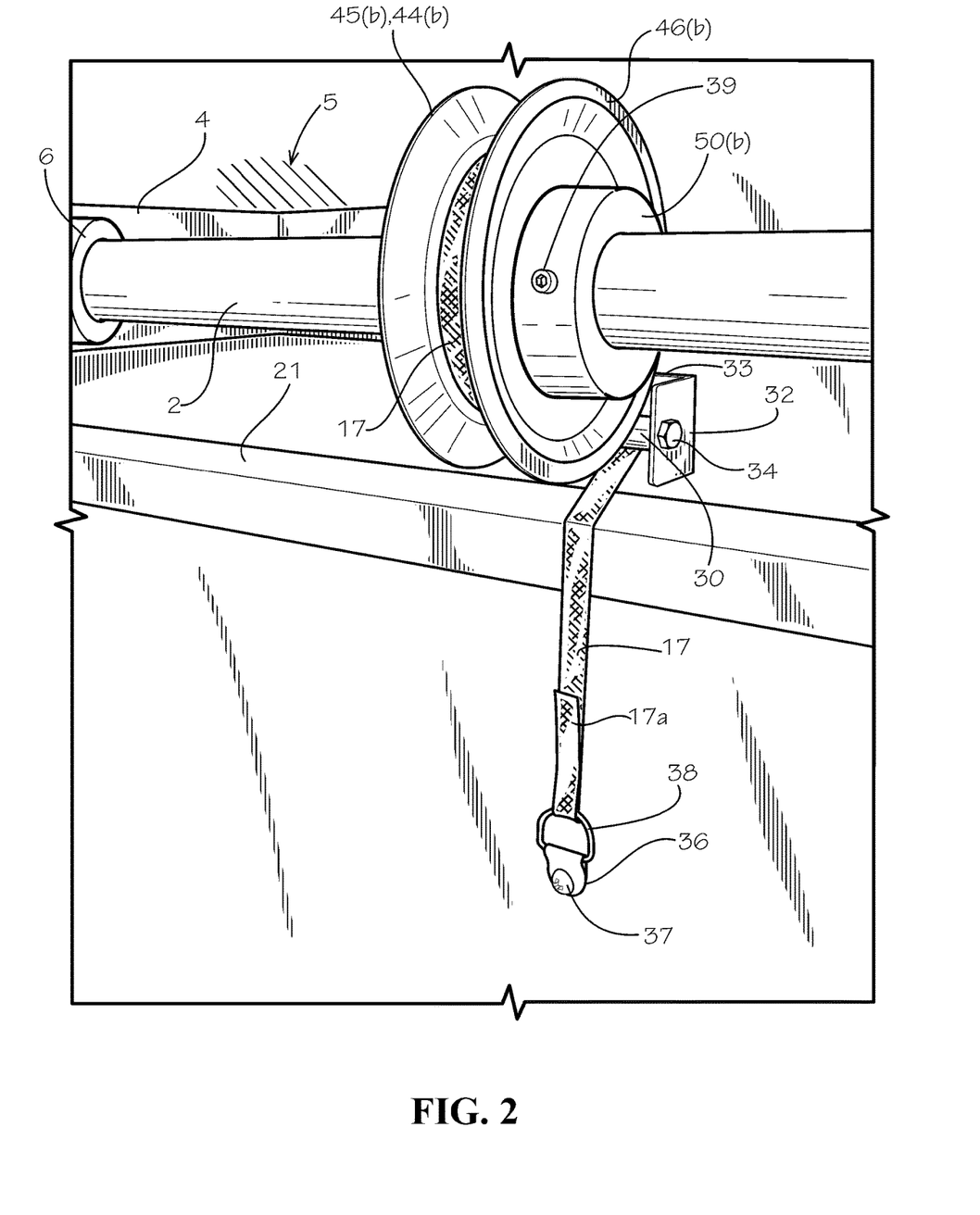
FIG. 2 presents an isolated view of a single strap reel 44(b) having a strap 17 coiled about the core 47 (out of view) of the strap reel 44(a), the strap 17 having been positioned in continuous contact with a roller pin 30 attached within a guide bracket 32.

FIG. 2 presents a close-up view of the second strap reel 44(a), which houses a length of the left strap 17 coiled about the core 47 (out of view) of the second strap reel 44(b). An exposed segment of the left strap 17 is restrained within a guide bracket 32, between the guide bracket's spine 33 and a roller pin 30. As shown for exemplary purposes only, the first end of the left strap 17 terminates with a connection to a C-ring 38 having an integral bolt clip 36.

FIG. 2 shows a length of strap, being an adjustment section 17(a) of the strap 17. The adjustment section 17(a) enables a user to pull taut any potential slack of the strap 17 against the C-ring 38. The pulling of the adjustment section 17(a) increases tension in the strap 17 so as to force the door mechanism 20 into a tighter fit against the opening 24. A screw 39 or other fastener may be inserted through the C-ring 38 to affix the bolt clip 36 to the exterior surface of the door mechanism 20. The single strap reel 44(b) shown may also represent the right-most strap reel 44(a) of a paring of strap reels 44(a), 44(b).

As shown in FIG. 2, a hollow roller pin 30 is rotatibly contained within the guide bracket 32 by a bolt 34. The roller pin 30 ensures smooth, bind-free movement of both the left and right straps 17, 18 when operating the door mechanism 20. Importantly, the roller pin 30 in each of the two guide brackets 32 also provides a fulcrum effect by which each of the straps 17, 18 may exert a mechanical advantage to efficiently maneuver the weight of the door mechanism 20 through its range of travel.

Each guide bracket 32 is attached to the surface of a structure 5, typically with standard wood screws proximate each strap reel 44(a), 44(b). This location ensures the correct positioning of each strap 17, 18 relative to each of the strap reels 44(a), 44(b) and the door mechanism 20. The guide bracket 32 and its roller pin 30 assist in creating the desired angle of opening of the door mechanism 20, as determined by the length of extension of the straps 17, 18 relative to the closed position of the door mechanism 20. The same functional connections and components described here, relative to the second strap reel 44(b) are likewise applicable to the second strap reel 44(a).

The first and second strap reels 44(a), 44(b) enable the straps 17, 18 to move the door mechanism 20 due to the second end of each respective strap 17, 18, being affixed near the upper, traveling edge 21 of the door mechanism 20. The movement of the straps 17, 18, causes the traveling edge 21 to rotate in an arc, relative to the hingedly-fixed bottom edge 22, as more clearly shown in FIG. 5. Thus, the traveling edge 21 is pulled toward a closed position or released toward a partially or fully open angular orientation relative to the door frame 23. Both straps 17, 18 perform their work in conjunction with rotation of the pipe drive shaft 2. This in turn, causes the first and second strap reels 44(a), 44(b) to either progressively collect or release a sufficient length of the respective straps 17, 18, thereby moving the door mechanism 20 toward a closed or open position.

FIG. 3 presents an exploded view of a grouping of PSODS 1 components collectively referred to as the first "strap reel assembly" 48(a). The strap reel assembly 48(a) shown is a depiction of a grouping which results in, for illustrative purposes, the formation of the first strap reel 44(a). The fully assembled strap reel assembly 48 is depicted as the completed first strap reel 44(a), shown in FIG. 4. In viewing FIG. 3, there are illustrated seven (7) essential components, being from left-to-right: a lock ring 40, a spring washer 41, a collar spring 42, a pipe sleeve collar 43, the first strap reel 44(a), including its core 47, a pipe sleeve 10, and a cylindrical lock gear 50.

In FIG. 3, it is to be noted that the right wall 46 of the first strap reel 44(a) is further constructed with a circumferential, planar arrangement of "driven" gear teeth 52. Further, a corresponding arrangement of "driving" gear teeth 51 is integral to the inner curvilinear edge of the lock gear 50. The driven gear teeth 52 and the driving gear teeth 51 are matched in size and spacing so as to mesh during normal operation of the PSODS 1. The engagement and dis-engagement of the driving gear teeth 51 and driven gear teeth 52 during normal operation of PSODS 1 results in a ratcheting effect on the first strap reel 44(a), shown. The identical ratcheting connection is also found in the second strap reel 44(b).

The pipe sleeve 10 shown in FIG. 3 comprises an interior surface 12 diameter slightly greater than the outer diameter of the associated pipe drive shaft 2, onto which the pipe sleeve 10 will be mounted. There is an outwardly protruding circumferential lip 11 about a first, or proximal end 14 of the pipe sleeve 10. Four PSODS 1 components, the lock ring 40, spring washer 41, collar spring 42, and pipe sleeve collar 43 all comprise inner diameters greater than the outer diameter of the pipe sleeve 10. In the initial preparation of the first reel assembly 48, these four components are sequentially mounted, in the recited left-to-right order, onto the exterior of the pipe sleeve 10, interiorly to the lip 11, thereby forming the first stage of a pipe sleeve 10 sub-assembly.

The resulting sub-assembly places one side of the lock ring 40 in direct abutment against the pipe sleeve lip 11, while the opposite exposed side of the lock ring 40 abuts the spring washer 42, which in turn, abuts the collar spring 42. The collar spring 42 and pipe sleeve collar 43 manifest identical end diameters.

In continuing with description of the strap reel assembly 48(a) in FIG. 3, an important step is to position the pipe sleeve 10 sub-assembly onto the outer diameter of the associated pipe drive shaft 2 at a pre-determined location along the length of the pipe drive shaft 2. The placement of the pipe sleeve 10 is governed by the utilization of at least one, or a plurality, of strap reels, 44(a), 44(b) for functioning of the PSODS 1. Upon placement of a pipe sleeve 10 sub-assembly at the desired location(s), the collar spring 42 is initially free of any spring tension.

The next step, beginning with the left wall 45 of the first strap reel 44(a) shown in FIG. 3, is to slide the inner diameter 49 of the core 47 of the first strap reel 44(a) along the outer surface of the pipe sleeve 10. The inner diameter 49 of the core 47 of the first strap reel 44(a) is slightly greater than the outer diameter of the pipe sleeve collar 43. The core 47 of the first strap reel 44(a) is constructed with circular openings 9, while the pipe sleeve collar 43 manifests co-located threaded apertures 3. This arrangement permits the insertion of hexagonal-head machine screws 39, or other fasteners, through the circular openings 9 of the strap reel 44(a) core 47 so as to fasten the core 47 of the first strap reel 44(a) onto the pipe sleeve collar 43.

This fastening operation causes the lock ring 40, spring washer 41, and collar spring 42 to fit snugly against one another, automatically placing an amount of linearly-directed compression force generated by the collar spring 42 against the outer edge of the pipe sleeve collar 43. The fastening step further causes the distal edge 13 of the pipe sleeve 10 to become oriented flush with the plane of the driven gear teeth 52 of the strap reel 44(a).

Next in the assembly sequence, the cylindrical lock gear 50 is placed onto the pipe drive 2 and is moved longitudinally a sufficient distance so as to cause the driving gear teeth 51 of the cylindrical lock gear 50 to mesh with the driven gear teeth 52 of the first strap reel 44(a). At this point, two hexagonal-head machine screws 39 are inserted and tightened, through threaded openings 3 of the cylindrical lock gear 50 to firmly secure it to the outer surface of the pipe drive shaft 2.

In this manner, the entirety of the exemplary strap reel assembly 48(a) becomes operational. Thus, when the pipe drive shaft 2 is rotated, the cylindrical lock gear 50 also is necessarily rotated, causing the first strap reel 44(a) to also rotate. This relationship is duplicated along the pipe drive shaft 2 with as many strap reels 44 as deemed necessary for efficient operation of the door mechanism 20.

Figure 4:
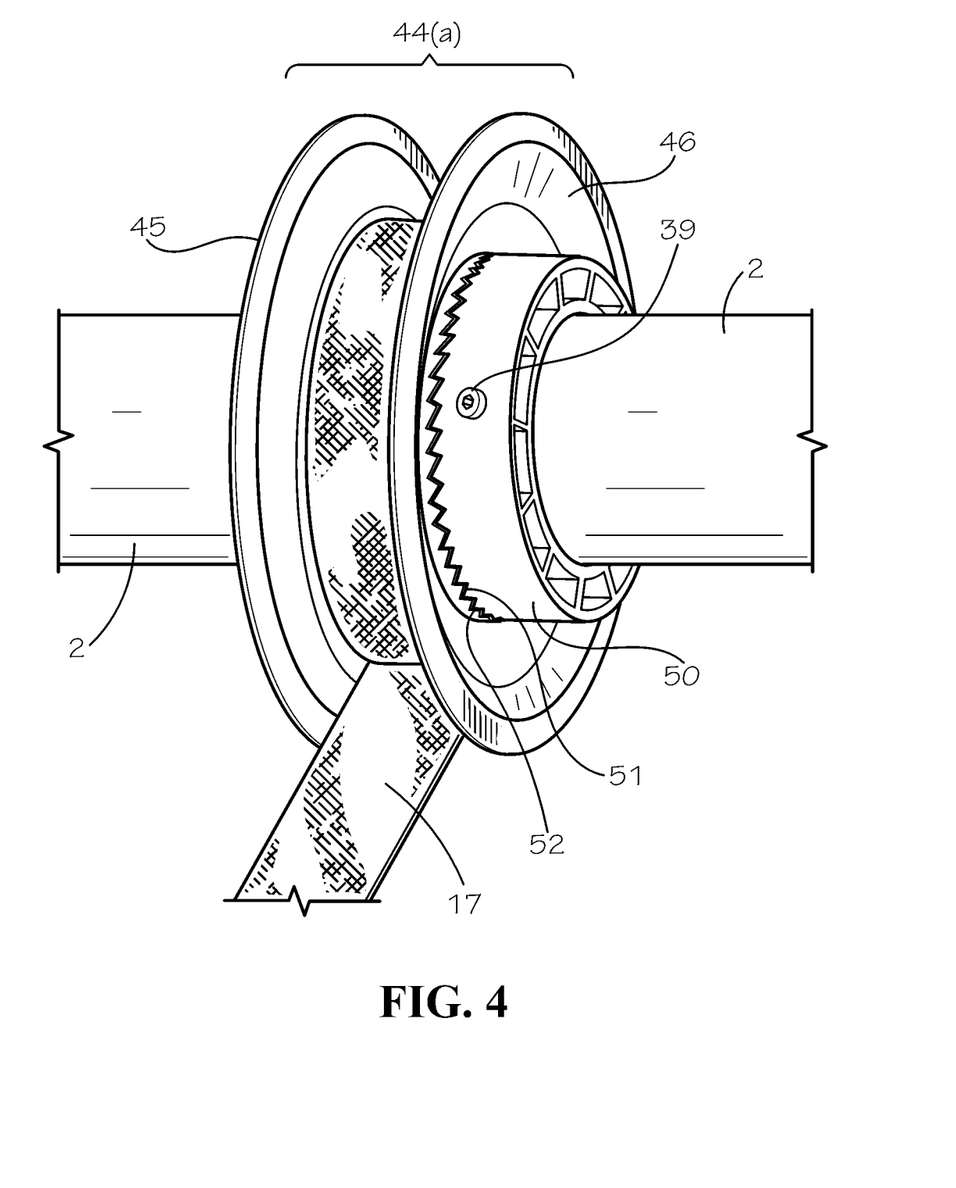
FIG. 4 depicts a close-up view of the results of a strap reel assembly 48(a), being compressed into its operating configuration as a first strap reel 44(a).

FIG. 4 depicts a close-up view of the finished first strap reel 44(a) having been having been assembled from the strap reel assembly 48(a) into its operating configuration. Further shown is the left strap 17 deployed from the strap reel 44(a). FIG. 4 essentially shows as primary components of the first strap reel 44(a), a fastener 39 securing the cylindrical lock gear 50 to the pipe drive shaft 2, a segment of the left strap 47, and further showing a slight separation between driving gear teeth 51 of the lock gear 50 and driven gear teeth 52 of the strap reel 44(a).

FIG. 5 depicts a cutaway view of a vertical surface of a structure 5 having an opening 24 (not shown) defined within the confines of a frame 23. The previously-described door mechanism 20 is shown in an open position, the bottom edge 22 of the door mechanism 20 having rotated about a hinged connection on the lower part of the frame 23. Ventilated air 25 is shown escaping the interior of the structure 5 and flowing outward through the opening 24. One brace 4 is depicted supporting the pipe drive shaft 2, the pipe drive shaft 2 having a first strap reel 44(a) attached thereto.

FIG. 6 displays a common type of hex-head setscrew 39 which may be used in various locations for attachment of components of the inventive concept.

FIG. 7 depicts a typical guide bracket 32, further showing a roller pin 30 used for guiding and restraining either strap 17, 18 during movement of the strap reels 44(a), (b) and door mechanism 20.

In the preferred embodiment, the pipe drive shaft 2 is driven by a motor, and rotates within the confines of the previously-mentioned drive shaft collar 6. When the strap reel(s) 44(a), (b) have been fully retracted, the door mechanism 20 is positioned to its fully closed position.

Occasionally the door mechanism 20 may not come to a tight, snug seal against the opening 24. In this situation, a user may manually employ an open-mouth wrench, or custom-built access tool, to rotate the sleeve collar 43 downward, which disengages the driving gear teeth 51 of the cylindrical lock gear 50 and the driven gear teeth 52 of the reel 44(a) [shown in FIG. 4]. At this point, the user may then pull the adjustment section 17(a) [shown in FIG. 2] of the strap 17 to force the door mechanism 20 into a tighter fit against the opening 24. The sleeve collar 43 may then be released so that the diving gear teeth 51 and the driven gear teeth 52 re-engage and maintain the closure of the door mechanism 20.

While preferred embodiments of the present inventive method have been shown and disclosed herein, it will be obvious to those persons skilled in the art that such embodiments are presented by way of example only, and not as a limitation to the scope of the inventive concept. Numerous variations, changes, and substitutions may occur or be suggested to those skilled in the art without departing from the intent, scope, and totality of this inventive concept. Such variations, changes, and substitutions may involve other features which are already known per se and which may be used instead of, in combination with, or in addition to features already disclosed herein. Accordingly, it is intended that this inventive concept be inclusive of such variations, changes, and substitutions, as described by the scope of the claims presented herein.

What is claimed is:

1. A ratcheted pipe and strap operating drive system, utilized for positioning of a hinged door mechanism, which hinged door mechanism is immediately adjacent to a correspondingly-dimensioned opening integral to a structure, the ratcheted pipe and strap drive operating system enabling placement of the door mechanism at any point between fully closed upon the opening, or spaced apart from the opening, the system comprising:

a straight pipe, at least two internally-ratcheted reel assemblies, at least two straps, at least two guide brackets having integral roller pins, at least two L-shaped braces, each having an integral drive shaft collar; and a plurality of fasteners; whereby each reel assembly further comprises a lock ring, a spring washer a collar spring, a pipe sleeve collar, a strap reel, said strap reel comprised of a left wall and a right wall, each wall being connected by a hollow core and further, having driven gear teeth on the right wall, a pipe sleeve, and a cylindrical lock gear having driving gear teeth corresponding to the driven gear teeth of the strap reel;

each of the at least two reel assemblies is rotatingly and symmetrically affixed onto the outer surface of the straight pipe;

the straight pipe is supported, at each end, within a drive shaft collar of the respective L-shaped brace, the braces further being permanently affixed to the structure proximate the opening of the structure cavity and oriented coaxially to the pipe;

each of the at least two guide brackets is affixed to the structure, proximate each strap reel and in alignment with, the core of each respective reel assembly;

each of the straps is attached at the first end of the strap to the core of one of the respective reel assemblies, the free length of each strap being routed between the guide bracket and the roller pin of the guide bracket, and the second end of the strap attached to the exterior surface of the door mechanism; whereby rotation of the pipe about its linear axis in one direction causes the reel assemblies to simultaneously rotate, thereby causing each of the at least two straps to move the hinged door in a first direction, relative to the opening of the structure and conversely, rotation of the pipe in the opposite direction, causes each reel assembly to rotate and move the hinged mechanism opposite of the first direction.

2. The pipe and strap operating drive system as in claim 1, wherein each reel assembly further comprises a lock ring, a spring washer a collar spring, a pipe sleeve collar, a strap reel, said strap reel comprising a left wall and a right wall, each wall being connected by a hollow core and further, having driven gear teeth on the right wall, a pipe sleeve, and a cylindrical lock gear having driving gear teeth corresponding to the driven gear teeth of the strap reel.

3. The pipe and strap operating drive system as in claim 1, further having a motorized means of axially rotating the pipe within the drive shaft collars of the braces.

4. The pipe and strap operating drive system as in claim 1, further comprising (a) a bolt clip affixed to the door mechanism, and (b) an adjusting length of strap, whereby upon insertion of the adjusting length of strap through the bolt clip, where such insertion enables the tautness of the respective strap against the external surface of the door mechanism to be increased.

\* \* \* \* \*